United States Patent [19]
Whitney

[11] Patent Number: 5,868,626
[45] Date of Patent: Feb. 9, 1999

[54] UNIVERSAL JOINT YOKE HAVING AXIALLY-EXTENDING GROOVES

[75] Inventor: Timothy M. Whitney, Toledo, Ohio

[73] Assignee: Dana Corporation, Toledo, Ohio

[21] Appl. No.: 846,246

[22] Filed: Apr. 30, 1997

[51] Int. Cl.[6] ................................................. F16D 3/16
[52] U.S. Cl. ........................................ 464/134; 464/130
[58] Field of Search ................................ 464/130, 134, 464/136

[56] References Cited

U.S. PATENT DOCUMENTS

| | | | |
|---|---|---|---|
| 2,577,692 | 12/1951 | Slaght | 464/130 |
| 3,421,342 | 1/1969 | Rossiter | 464/130 |
| 3,552,811 | 1/1971 | Kayser | 464/130 |
| 3,958,431 | 5/1976 | Moring | 464/130 |
| 4,472,158 | 9/1984 | Joyner . | |
| 4,522,608 | 6/1985 | Joyner . | |
| 4,575,361 | 3/1986 | Thatcher . | |
| 4,702,722 | 10/1987 | Narue et al. | 464/134 |
| 4,768,995 | 9/1988 | Mangiavacchi | 464/130 |
| 5,044,227 | 9/1991 | Rugraff . | |

FOREIGN PATENT DOCUMENTS

| | | | |
|---|---|---|---|
| 2060136 | 4/1981 | United Kingdom | 464/130 |
| 2125935 | 3/1984 | United Kingdom | 464/134 |

Primary Examiner—Eileen Dunn Lillis
Attorney, Agent, or Firm—MacMillan, Sobanski and Todd, LLC

[57] ABSTRACT

An improved yoke for use in a universal joint is described having a plurality of axially-extending grooves formed therein. The grooves are formed in the outer cylindrical surface of the sleeve portion of a yoke connected to an end of a vehicle driveshaft so as to permit access of a nut runner or other suitable tool for tightening the fasteners used for securing the retaining device to the other yoke used in the universal joint. The number of grooves provided is dependent on the number of fasteners used to secure the retaining device to the other yoke used in the universal joint. The length, width, and depth of the grooves may vary depending on a number of factors including the clearances between the yokes and other adjacent vehicle components and the type of tool required to secure the retaining device to the yoke. The axially-extending grooves are formed in the yoke such that a fastening tool will be aligned with the retaining device fasteners when the tool is positioned in a groove. The grooves are sized to be sufficiently large to permit access for the fastening tool, but small enough to not adversely affect the overall strength of the yoke.

15 Claims, 2 Drawing Sheets

UNIVERSAL JOINT YOKE HAVING AXIALLY-EXTENDING GROOVES

BACKGROUND OF THE INVENTION

This invention relates in general to universal joints and in particular to an improved yoke having grooves formed in its outer surface for providing access for a tool used to assemble the universal joint.

Universal joints are well known devices which provide a driving connection between two members adapted to rotate about non-aligned axes of rotation. Universal joints of this type are widely used between rotatable driveshafts in vehicle drive train systems. Typically, such universal joints include a cross having a central body portion with four trunnions extending outwardly therefrom. The trunnions are oriented in a single plane and extend at right angles relative to one another. A bearing cup is mounted on the end of each of the trunnions. Needle bearings or similar means are provided between each of the trunnions and its associated bearing cup to permit the bearing cup to rotate relative to the trunnion. One pair of opposed bearing cups is connected to a first yoke secured to the first rotatable shaft, while the other pair of opposed bearing cups is connected to a second yoke secured to the second rotatable shaft.

In a typical vehicle drive train assembly, a first universal joint is used to connect a first end of the tubular main driveshaft to the output shaft of the transmission. A second universal joint is used to connect the opposite end of the driveshaft to the pinion shaft of the differential. Typically, the yoke secured to each end of the driveshaft is referred to as a "tube yoke." The yoke attached to either the transmission output shaft or the differential pinion shaft is usually referred to as an "end yoke." The tube yoke and the end yoke are similarly constructed in that they both have a generally cylindrical body portion having a sleeve portion extending axially in one direction and a pair of yoke arms extending axially in the opposite direction. In both the tube yoke and the end yoke, the rotatable shaft is secured to the sleeve portion. The structure of the end yoke often differs from the tube yoke in the construction of the yoke arms. Typically, each yoke arm of a tube yoke has a cylindrical opening formed therein for receiving and completely enclosing a bearing cup secured on the end of a trunnion of the universal joint cross. Thus, this type of tube yoke is referred to as a "full round" tube yoke. However, in some types of end yokes, each yoke so arm has a semi-cylindrical recess formed therein for receiving and only partially enclosing a bearing cup. A strap having a corresponding semi-cylindrical surface or a U bolt is used to complete the cylindrical opening and fully enclose the bearing cup. Typically, the retaining straps are secured to the yoke arms by threaded fasteners.

During assembly of the universal joint used to connect the driveshaft to the differential pinion shaft, the sleeve portion of a full round tube yoke is secured to the driveshaft tube and the sleeve portion of the half round end yoke is secured to the differential pinion shaft. The yoke arms of the full round tube yoke are connected to respective bearing cups mounted on a first pair of opposed trunnions of the universal joint cross. The second pair of opposed trunnions of the universal joint cross are aligned within the semi-cylindrical recess formed in the yoke arms of the half round end yoke. The retaining straps are then secured to the half round end yoke by the threaded fasteners.

In the past, the diameter of the driveshaft tube and the full round tube yoke were small enough that a conventional pneumatic nut runner or other suitable tool could be used to tighten the retaining strap threaded fasteners into the half round end yoke. In some vehicles, however, the diameter of the driveshaft tube and the full round tube yoke are increased to avoid critical speed vibrations and noise. It has been found that the increased diameter of the full round end yoke blocks the access for the nut runner to tighten the threaded fasteners, thus requiring a less desirable alternative tool or threading process. Ideally, it would be desirable to modify the larger diameter full round tube yoke such that conventional tools can still be used to secure the retaining straps to the half round end yoke used in the universal joint.

SUMMARY OF THE INVENTION

This invention is directed to an improved yoke for use in a universal joint having a plurality of axially-extending grooves formed therein to permit access of a nut runner or other suitable tool for tightening the fasteners used for securing the retaining strap or other retaining device to the other yoke used in the universal joint. In a preferred embodiment, the grooves are formed in the outer cylindrical surface of the sleeve portion of a tube yoke connected to an end of a is vehicle driveshaft. The number of grooves provided is dependent on the number of fasteners used to secure a retaining device to an end yoke used in the universal joint. The length, width, and depth of the grooves may vary depending on a number of factors including the clearances between the tube yoke and other adjacent vehicle components and the type of tool required to secure the retaining device to the end yoke. The axially-extending grooves are formed in the tube yoke such that a fastening tool will be aligned with the retaining device fasteners when the tool is positioned in a groove. The grooves are sized to be sufficiently large to permit access for the fastening tool, but small enough to not adversely affect the overall strength of the yoke.

In a preferred embodiment of the invention, the grooves extend axially from a shoulder formed in the sleeve portion of the tube yoke to the base of the yoke arms. Preferably, the grooves extend at an angle relative to a radial centerline of the tube yoke which is equidistant from the yoke arms of the tube yoke. In addition, the grooves may be tapered having a minimum width at the end adjacent the shoulder which tapers outward to a maximum width at the end adjacent the base of the yoke arms. The depth of the grooves may also vary with a minimum depth occurring at the end adjacent the shoulder which increases to a maximum depth at the end adjacent the base of the yoke arms. Preferably, the grooves are machined into the sleeve portion of the tube yoke after the yoke is forged and turned.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
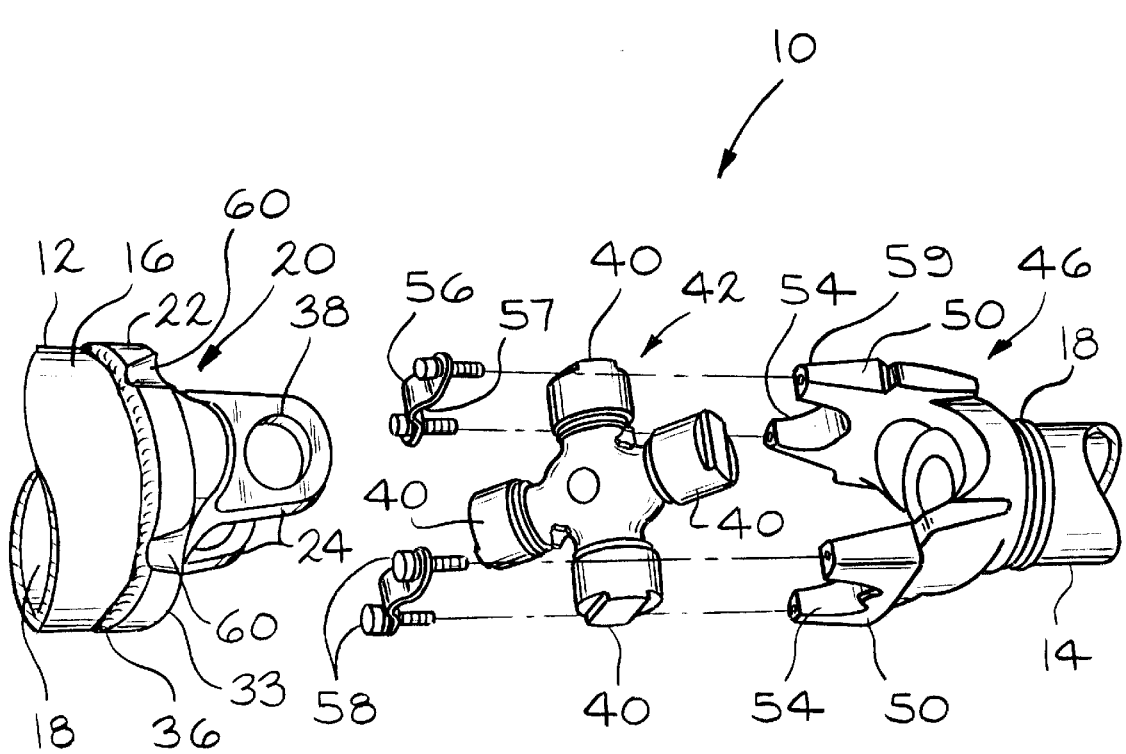
FIG. 1 is an exploded perspective view of a universal joint which includes a full round tube yoke in accordance with this invention.

Referring now to the drawings, there is illustrated in FIG. 1 a universal joint, indicated generally at 10, which is used to transfer the torque from a rotating main transmission driveshaft 12 to the pinion shaft 14 used in a differential (not shown). As is well known, the driveshaft 12 is a hollow cylindrical tube having a pair of open ends 16 and an inner cylindrical surface 18. The driveshaft tube 12 is operatively connected to the transmission (not shown) through another universal joint (not shown) and therefore, rotates whenever the transmission is in gear and coupled to a running engine (not shown). The driveshaft 12 is conventional in the art and may be formed from a metal or a suitable composite material, such as an epoxy or a phenolic resin, which is reinforced with a plurality of high strength and high modulus fibers, such as carbon graphite or fiber glass.

Figure 2:
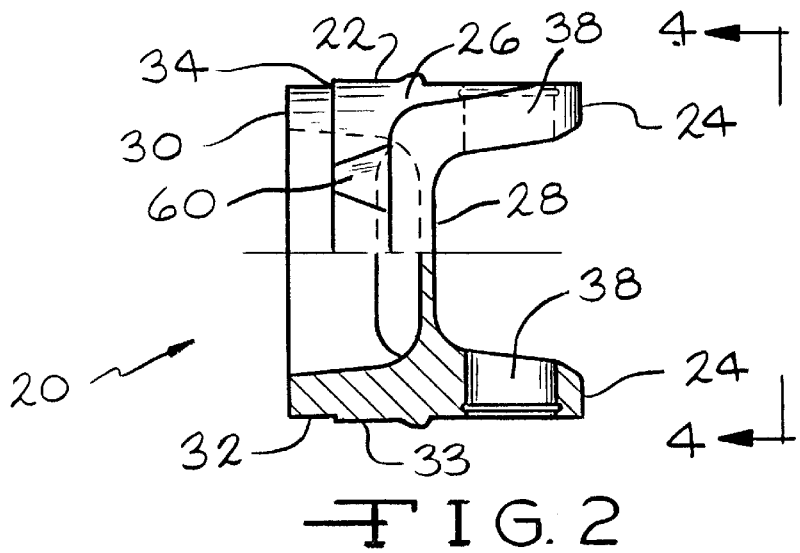
FIG. 2 is a plan view, partially in section, of a full round tube yoke in accordance with this invention.

The universal joint 10 shown in FIG. 1 includes a tube yoke 20 which is secured to one end 16 of the driveshaft 12. The tube yoke 20 of this invention is shown further in FIGS. 2 through 4. As shown therein, the tube yoke 20 has a generally cylindrical body having a sleeve portion 22 extending axially in one direction and a pair of yoke arms 24 extending axially in the opposite direction. The sleeve portion 22 has a first end 26 which is joined to the base 28 of the yoke arms 24 and a second, open end 30 which connected to the driveshaft 12. The open end 30 of the sleeve portion 24 may be formed having a diameter as defined by a outer cylindrical surface 32 which is smaller than the diameter of the first end 26, as defined by the outer cylindrical surface 33. The use of the reduced diameter in the open end 30 forms an external annular shoulder 34 between the open end 30 and the first end 26. The outer diameter of the sleeve portion 22 of the tube yoke 20, as defined by the outer cylindrical surface 32, is typically slightly larger than the inner diameter of the driveshaft 12, as defined by its inner cylindrical surface 18. When the universal joint 10 is assembled with the driveshaft 12, the sleeve portion 22 of the tube yoke 20 is inserted longitudinally within an open end 16 of the driveshaft 12. As such, the outer cylindrical surface 32 of the sleeve portion 22 engages the inner cylindrical surface 18 of the driveshaft 12 in a light press fit relationship. This light press fit engagement facilitates the longitudinal alignment and concentricity of the sleeve portion 22 of the tube yoke 20 with the driveshaft 12. The tube yoke 20 is usually inserted until a leading edge of the driveshaft 12 abuts the shoulder 34 formed on the tube yoke 20. Typically, a weld 36 (shown in FIG. 1) is used to secure the tube yoke 20 to the driveshaft 12 in a relatively permanent manner. Alternatively, the tube yoke 20 and driveshaft 12 may be adhesively bonded or otherwise relatively permanently secured together.

The yoke arms 24 of the tube yoke 20 have respective aligned cylindrically-shaped, closed bores 38 formed therethrough. These bores 38 are adapted to receive a pair of bearing cups 40 of a conventional universal joint cross, indicated generally at 42 in FIG. 1. Because the bores 38 will completely enclose the bearing cups 40 when positioned therein, this type of yoke is referred to as a "full round" yoke. In the illustrated embodiment, the pair of bearing cups 40 positioned in the bores 38 may be retained therein with a snap ring (not shown). Alternatively, the bearing cups 40 may be retained in the bores 38 by the use of a plate (not shown) which is secured to the yoke arms 22 with threaded fasteners (not shown). The tube yoke 20 and its operation described thus far is generally well-known to those skilled in the art.

The illustrated universal joint 10 also includes a second yoke, indicated generally at 46, which is secured to a shaft, such as the differential pinion shaft 14. In the illustrated embodiment, this second yoke is shown as a half round end yoke. Typically, a half round end yoke 46 is used for ease of installation of the universal joint cross 42. As shown therein, the structure of the half round end yoke 46 is similar to the full round tube yoke 20 in that the end yoke 46 has a generally cylindrical body having a sleeve portion 48 (not shown in FIG. 1) extending axially in one direction and a pair of yoke arms 50 extending axially in the opposite direction. The end yoke 46 may be secured to the pinion shaft 14 using a splined connection which is capable of accommodating changes in overall axial length of the drive train assembly as the vehicle is driven. Alternatively, the shaft 14 may be welded or otherwise secured to the end yoke 46.

One difference between the tube yoke 20 and the end yoke 46 is the structure of the yoke arms 24 and 50, respectively. In contrast to the tube yoke 20 having closed bores 38, the end yoke 46 has semi-cylindrical recesses 54 formed therein which are adapted to receive, but only partially enclose, a pair of opposed bearing cups 40 of the cross 42. The bearing cups 40 are retained within the end yoke 46 by a pair of retaining straps 56 which are secured to the yoke arms 50. In the illustrated embodiment, each retaining strap 56 defines a semi-cylindrical surface or similar curved surface 57 which corresponds to approximately one-half of the outer cylindrical surface of each bearing cup 40. Typically, each retaining strap 56 is secured to the end yoke arm 50 with a pair of threaded fasteners 58. Alternatively, a pair of opposed bearing cups 40 may be retained within the end yoke 46 with a U-bolt and corresponding fasteners.

During assembly of the universal joint 10, the first pair of opposing bearing cups 40 are positioned within the cylindrical closed bores 38 formed in the tube yoke arms 24. Next, the second pair of opposing bearing cups 40 are positioned within the semi-cylindrical recesses 54 formed in the end yoke arms 50. The retaining straps 56 are positioned over these bearing cups 40 and the threaded fasteners 58 are partially inserted into a corresponding threaded bore 59 formed in the end yoke arms 50 so as to completely enclose and retain the cross 42 within the end yoke 46. In the past, the diameter of the tube yoke 20 and driveshaft 12 was small enough such that a pneumatic nut runner (not shown) or other suitable tool could be aligned parallel and next to the tube yoke 20 so as to tighten the threaded fasteners 58 within the end yoke 46. Alternatively, in some assembly processes, it was possible to move the driveshaft 12 and tube yoke 20 as it pivoted on the cross 42 so as to provide the access to the end yoke 46 and threaded fasteners 58. Recently, it has become desirable to increase the diameter of the driveshaft 12 and accordingly, the tube yokes 20 secured thereto. However, it has been found that the larger size driveshaft 12 and tube yokes 20 blocks access to the end yoke 46 and threaded fasteners 58, thereby requiring a modified tool or process to assemble the universal joint 10. In order to eliminate the need for new tooling or processes, this invention contemplates that a plurality of grooves 60 be provided on the tube yoke 20 so as to provide the access needed for conventional tools.

Figure 3:
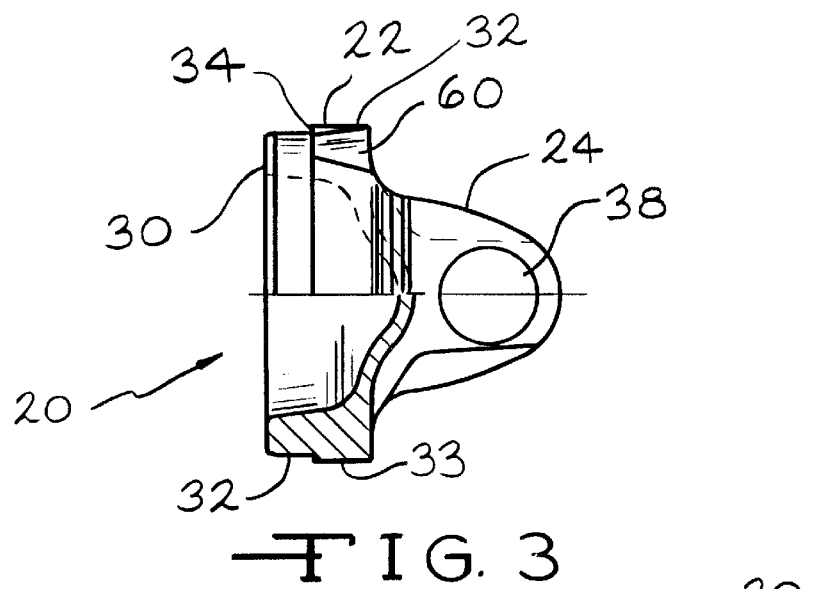
FIG. 3 is a view similar to FIG. 2, except that this view is rotated 90°.
Figure 4:
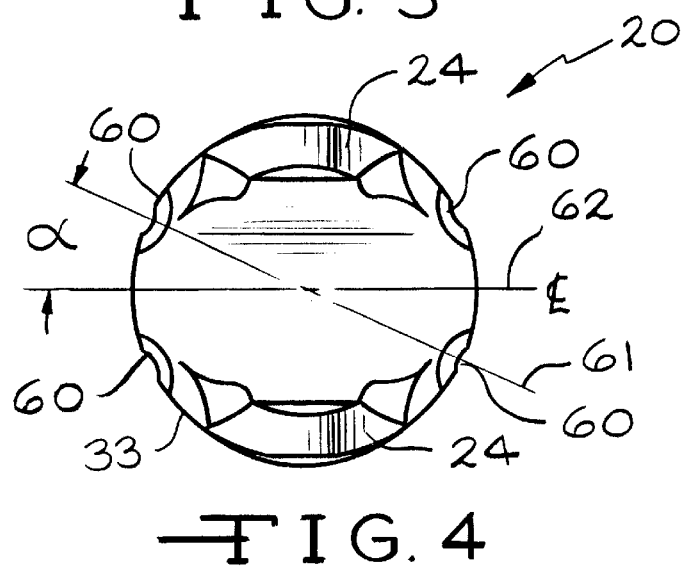
FIG. 4 is an end view of the full round tube yoke shown in FIG. 2.

In the illustrated embodiment shown in FIGS. 1 through 4, four axially-extending grooves 60 are formed in the outer cylindrical surface 33 of the sleeve portion 22 of the tube yoke 20. As best shown in FIG. 4, the grooves 60 are formed in the free areas 35 of the outer cylindrical surface 33 of the sleeve portion 22 from which the yoke arms 24 do not extend. The length of the grooves 60 may vary depending on the size of the tool used to tighten the fasteners 58, the size of the tube yoke 20, and the clearances surrounding the tube yoke 20. Preferably, the maximum length of the grooves 60 is limited by the axial distance which extends from the base 28 of the yoke arms 24 to the shoulder 34 (or the weld 36 after the driveshaft 12 has been welded to the tube yoke 20.) As further shown in FIGS. 2 and 4, the grooves 60 may be tapered with the minimum width being adjacent the shoulder 34 and the maximum width being adjacent the base 28 of the yoke arms 24. The tapered shape of the grooves allows the grooves to function as a funnel in guiding and aligning the tool with the threaded fasteners 58. As shown in FIGS. 3 and 4, the depth of the grooves 60 may also vary over the length of the groove 60, with the minimum depth occurring near the shoulder 34 and the maximum depth occurring near the base 28 of the yoke arms 24. The depth is also dependent on the size of the tool required for the fasteners 58 and the clearances surrounding the tube yoke 20. As an example only, the illustrated embodiment of the tube yoke 20 shown in FIGS. 1 through 4 is adapted to be used with a driveshaft 12 having an outer diameter of about 4.5 inches (114 mm). The grooves formed in this size of tube yoke 20 have a length of about 0.8 inches (20 mm), a maximum depth of about 0.25 inches (6 mm) and a maximum width of about 0.6 inches (15 mm).

In general, the grooves 60 should be formed so that the appropriate tool will be aligned with the fasteners 58 used for securing the retaining straps 56 or other retaining device to the end yoke 46. As seen in FIG. 1, a tool (not shown) will be axially aligned with the fasteners 58 when positioned in the grooves 60 so as to be able to tighten the threaded fasteners 58 in the corresponding threaded bores 59. As further shown in FIG. 4, the grooves 60 may extend along a line 61 at an angle a relative to a radial centerline 62 of the tube yoke 20. As shown therein, this radial centerline 62 may be defined as the centerline equidistant from the yoke arms 24 of the tube yoke 20. Preferably, the grooves 60 extend at an angle α of about 15° to 40°. More preferably, the grooves 60 extend an angle α of about 20° to 30° and most preferably, from about 25° to 27°. Preferably, the grooves 60 are machined into the tube yoke 20 after the tube yoke 20 has been forged and turned. Alternatively, the grooves 60 may be formed in the yoke 20 when the yoke 20 is initially manufactured using any manufacturing process which is known to one skilled in the art.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A universal joint assembly for a vehicle driveshaft assembly comprising:
   a cross including first and second pairs of trunnions, each of said trunnions having a bearing cup mounted thereon;
   a first yoke including a pair of yoke arms, said bearing cups of said first pair of trunnions being supported on said pair of yoke arms of said first yoke by respective retainer straps secured to said first yoke by respective fasteners; and
   a second yoke including a pair of yoke arms, said bearing cups of said second pair of trunnions being supported on said pair of yoke arms of said second yoke, said second yoke having at least one groove formed therein that is aligned with at least one of said fasteners secured to said first yoke to facilitate access thereto by a tool.

2. The universal joint assembly defined in claim 1 wherein said yoke arms of said first yoke have respective recesses formed therein that receive said bearing cups of said first pair of trunnions therein.

3. The universal joint assembly defined in claim 1 wherein a first one of said retainer straps is secured to said first yoke by a first pair of threaded fasteners, and wherein said second yoke has a first pair of grooves formed therein that are respectively aligned with said first pair of threaded fasteners.

4. The universal joint assembly defined in claim 3 wherein a second one of said retainer straps is secured to said first yoke by a second pair of threaded fasteners, and wherein said second yoke has a second pair of grooves formed therein that are respectively aligned with said second pair of threaded fasteners.

5. The universal joint assembly defined in claim 1 wherein said second yoke has a plurality of grooves formed therein that are respectively aligned with a plurality of said fasteners secured to said first yoke.

6. The universal joint assembly defined in claim 1 wherein said yoke arms of said second yoke have respective bores formed therein that receive said bearing cups of said second pair of trunnions therein.

7. The universal joint assembly defined in claim 1 wherein said groove formed in said second yoke extends at an angle relative to a radial centerline of said second yoke.

8. The universal joint assembly defined in claim 7 wherein said angle is from about 15° to about 40°.

9. The universal joint assembly defined in claim 8 wherein said angle is from about 20° to about 30°.

10. The universal joint assembly defined in claim 9 wherein said angle is from about 25° to about 27°.

11. The universal joint assembly defined in claim 1 wherein said groove extends from a shoulder formed on said second yoke to a base of said pair of yoke arms on said second yoke.

12. The universal joint assembly defined in claim 1 wherein said groove has a varying width.

13. The universal joint defined in claim 12 wherein said groove extends from a shoulder formed on said second yoke to a base of said pair of yoke arms on said second yoke, and wherein the width of said groove varies from a minimum width adjacent said shoulder to a maximum width adjacent said base of said yoke arms on said second yoke.

14. The universal joint assembly defined in claim 1 wherein said groove has a varying depth.

15. The universal joint defined in claim 14 wherein said groove extends from a shoulder formed on said second yoke to a base of said pair of yoke arms on said second yoke, and wherein the depth of said groove varies from a minimum depth adjacent said shoulder to a maximum depth adjacent said base of said yoke arms on said second yoke.

* * * * *